US009843948B2

(12) United States Patent
Hui et al.

(10) Patent No.: US 9,843,948 B2
(45) Date of Patent: Dec. 12, 2017

(54) PATHWAY-BASED DATA INTERRUPTION DETECTION

(71) Applicant: T-Mobile USA, Inc., Bellevue, WA (US)

(72) Inventors: Jie Hui, Mercer Island, WA (US); Yunhan Jia, Ann Arbor, MI (US); Suchit Satpathy, Hackettstown, NJ (US); Kevin Lau, Issaquah, WA (US); Kranthi Sontineni, Renton, WA (US); Samson Kim-Sun Kwong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 103 days.

(21) Appl. No.: 14/661,886

(22) Filed: Mar. 18, 2015

(65) Prior Publication Data

US 2016/0277952 A1 Sep. 22, 2016

(51) Int. Cl.
*H04W 24/08* (2009.01)
*H04W 24/04* (2009.01)
*H04W 24/02* (2009.01)

(52) U.S. Cl.
CPC ........... *H04W 24/08* (2013.01); *H04W 24/04* (2013.01); *H04W 24/02* (2013.01)

(58) Field of Classification Search
CPC ............................ H04W 24/02; H04W 24/08
See application file for complete search history.

(56) References Cited

U.S. PATENT DOCUMENTS

| 8,339,968 | B2* | 12/2012 | Howe | H04L 12/2602 |
| | | | | 348/180 |
| 2003/0139962 | A1* | 7/2003 | Nobrega | G06Q 30/02 |
| | | | | 709/217 |
| 2006/0013367 | A1* | 1/2006 | Sawyer | H04L 51/14 |
| | | | | 379/88.01 |
| 2007/0130248 | A1* | 6/2007 | Thacher | G01C 21/26 |
| | | | | 709/202 |
| 2008/0082661 | A1 | 4/2008 | Huber | |
| 2008/0144519 | A1 | 6/2008 | Cooppan | |
| 2009/0122879 | A1* | 5/2009 | Howe | H04L 12/2602 |
| | | | | 375/240.27 |

(Continued)

OTHER PUBLICATIONS

"International Search Report and Written Opinion" for Application No. PCT/US2016/021616 dated Jun. 17, 2016, 9 pages.

*Primary Examiner* — Albert T Chou
(74) *Attorney, Agent, or Firm* — Han Santos, PLLC; Elliott Y. Chen

(57) ABSTRACT

A telecommunication carrier may use data collected from user devices to pinpoint sources of data interruptions in the communication connection between a carrier network and the user devices. The telecommunication carrier may receive multiple reports of detected data interruptions at one or more computing devices of a carrier network. The detected data interruptions include a data interruption to a user device that is detected by an agent application on the user device that monitors of at least one of an audio pathway or a video pathway of the user device. The telecommunication carrier may aggregate data interruption information from the multiple reports of the detected data interruptions, and analyze the data interruption information to pinpoint one or more sources of a detected data interruption.

20 Claims, 10 Drawing Sheets

(56) References Cited

U.S. PATENT DOCUMENTS

| | | | |
|---|---|---|---|
| 2010/0036942 A1 | 2/2010 | Quere et al. | |
| 2010/0246432 A1* | 9/2010 | Zhang | H04L 41/5003 370/252 |
| 2012/0063331 A1* | 3/2012 | Miyazaki | H04L 12/18 370/248 |
| 2012/0144415 A1 | 6/2012 | Velusamy et al. | |
| 2014/0317274 A1 | 10/2014 | Parker et al. | |
| 2015/0172152 A1* | 6/2015 | Aggarwal | G06F 11/0769 709/204 |
| 2016/0173486 A1* | 6/2016 | Abbott | G06F 21/6245 713/175 |

* cited by examiner

US 9,843,948 B2

PATHWAY-BASED DATA INTERRUPTION DETECTION

BACKGROUND

Wireless communication devices are integral to the daily lives of most users. Wireless communication devices are used to make voice calls, check email and text messages, update social media pages, stream media, browse websites, and so forth. As a result, users of wireless communication devices expect telecommunication carriers to provide constant and reliable telecommunication and data communication service at all times. Network engineers of a telecommunication carrier generally rely on symptoms reported by users to troubleshoot network problems. Widespread network issues often result in a high volume of support calls to the customer support center of a telecommunication carrier, which may temporarily overwhelm customer support staff and the network engineers. Conversely, isolated or sporadic problems with a network of telecommunication carrier may be under reported by users. The under reporting may hide such network problems from the telecommunication carrier. As a result, remediation of network faults by the telecommunication carrier may be delayed.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
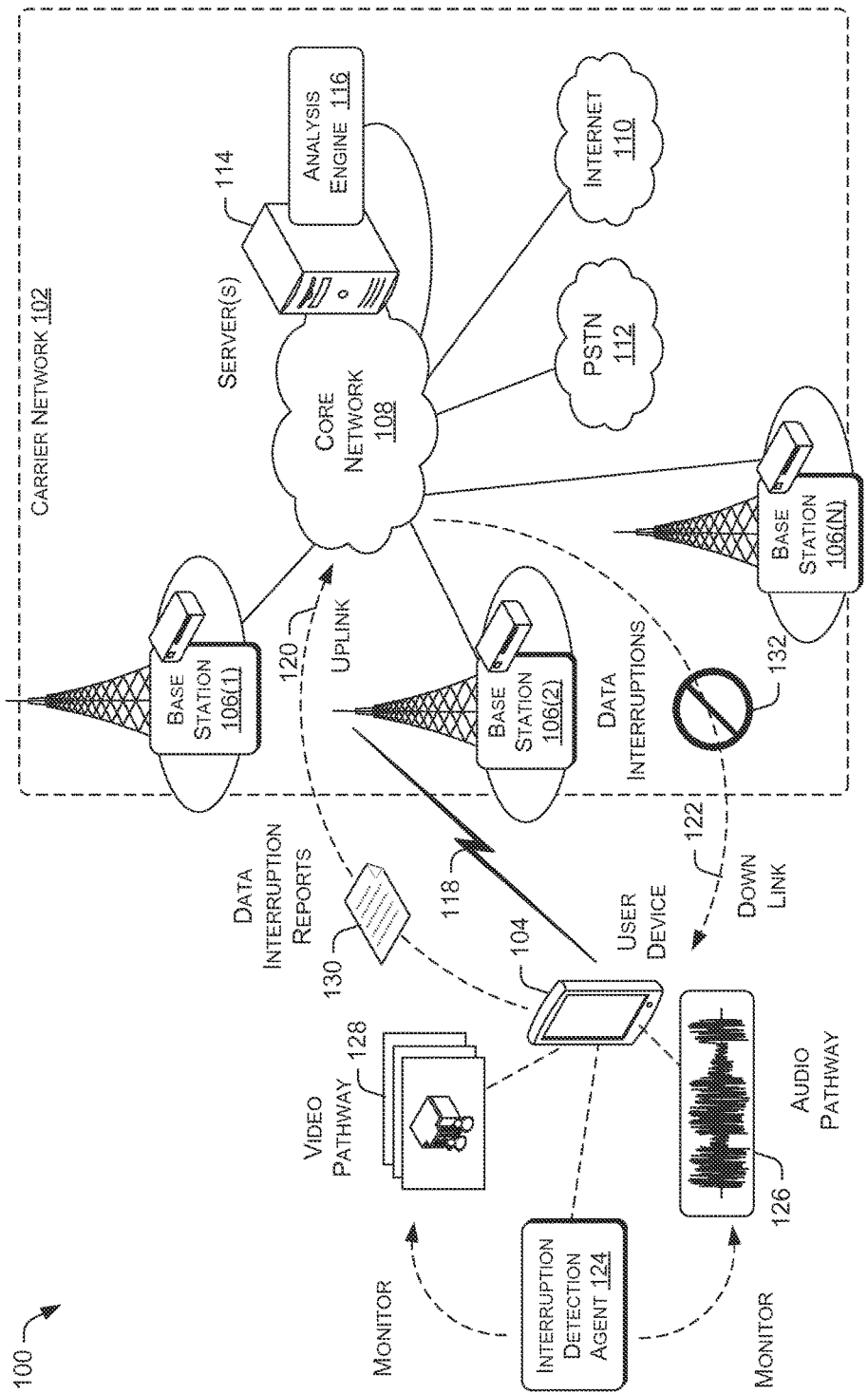
FIG. 1 illustrates an example network architecture for implementing pathway-based data interruption detection.

This disclosure is directed to techniques for using an audio pathway or a video pathway on a user device to detect interruptions in the transmission of data from the wireless network of a telecommunication carrier to the user device. In some instances, the interruption in the data transmission may manifest as a loss of audio data at the audio pathway and/or video data at the video pathway of the user device. In other instances, the interruption in the data transmission may manifest as degradation in the quality of the audio data and/or the video data. The loss or degradation of the audio data or the video data may be noticeable during a voice call, video telephony, audio streaming, video streaming, or multimedia streaming. The loss or degradation may be caused by a disruption in the communication downlink from the carrier network to the user device or problems within the user device.

In various embodiments, an agent application on a user device may monitor at least one of an audio pathway or a video pathway used by applications installed on the user device. The audio pathway may refers to a processing path provided by hardware and software audio processing components of the user device that convert audio data packets to audio wave signals that drive one or more audio speakers of the user device. Likewise, the video pathway may refer to a processing path provided by hardware and software video processing components of the user device that convert video data packets to video signals that drive a display of the user device.

By monitoring for data loss or disruptions in the audio pathway or the video pathway of the user device, the agent application may detect data interruptions to the user device and automatically report such data interruptions to an analysis engine of the telecommunication carrier. In turn, the analysis engine may aggregate and analyze data interruption reports from multiple user devices to pinpoint one or more sources of the data interruption. In some embodiments, the agent application on the user device may use other data sources on the user device to corroborate the detected data loss or disruption prior to reporting a data interruption. Such corroboration by the agent application may reduce false positive reports of data interruption to the user device. The agent application on the user device may further provide updates to the user of the user device. For example, the agent application may display a message that indicates a data interruption was reported to the telecommunication carrier, so that the user may be assured that the telecommunication carrier will remedy the fault. In another example, the agent application may display a user interface that enables the user to provide feedback regarding the experience of the user during a data interruption.

In additional embodiments, base station nodes in the wireless network of the telecommunication carrier may have the ability to detect stoppage or slowdown in the transmission of the data packets to one or more user devices. Such detected stoppage or slowdown may be used by the telecommunication carrier to verify data interruptions to the one or more user devices or independently detect network problems that contribute to the data interruptions.

In at least one embodiment, a telecommunication carrier may use data collected from user devices to pinpoint sources of data interruptions in the communication connection between the carrier network and the user devices. The telecommunication carrier may receive multiple reports of detected data interruptions at one or more computing devices of a carrier network. The detected data interruptions includes a data interruption to a user device that is detected by an agent application on the user device that monitors of at least one of an audio pathway or a video pathway of the user device. The telecommunication carrier may aggregate data interruption information from the multiple reports of the detected data interruptions, and analyze the data interruption information to pinpoint one or more sources of a detected data interruption.

The techniques may enable a telecommunication carrier to automatically receive reports of the data interruption from user devices. The aggregation and analysis of such reports may reveal patterns and trends that pinpoint the sources of the data interruption. The ability to quickly pinpoint problems may enable the telecommunication carrier to remedy the cause of a data interruption before the interruption becomes more disruptive or widespread. Thus, the techniques may alleviate expenses incurred by customer support centers in taking in outage reports, as well as reduce technical troubleshooting time and complexity experienced by network engineers. The techniques described herein may be implemented in a number of ways. Example implementations are provided below with reference to the following figures.

Example Network Architecture

FIG. 1 illustrates an example scheme 100 for implementing pathway-based data interruption detection. The scheme 100 may include a telecommunication carrier and a user device 104. The telecommunication carrier may operate a carrier network that includes base station nodes 106(1)-106(N) and a core network 108. The carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The base stations 106(1)-106(N) are responsible handling voice and data traffic between user devices, such as the user device 104, and the core network 108. The core network 108 may provide telecommunication and data communication services to multiple user devices. For example, the core network may connect the user device 104 to other telecommunication and data communication networks, such as the Internet 110 and the public switched telephone network (PSTN) 112. In various embodiments, the core network 108 may include one or more servers 114 that implement network components. For example, the network components may include a serving GPRS support node (SGSN) that routes voice calls to and from the PSTN 112, a Gateway GPRS Support Node (GGSN) that handles the routing of data communication between external packet switched networks and the core network 108. The network components may further include a Packet Data Network (PDN) gateway (PGW) that routes data traffic between the GGSN and the Internet 110. In various embodiments, one or more servers 114 may implement an analysis engine 116.

The user device 104 may be a smartphone, a tablet computer, an embedded computer system, or any other device that is capable of using the wireless communication services that are provided by the telecommunication carrier. In various embodiments, a user may use the user device 104 to make voice calls, send and receive text messages, and download content from the Internet 110. The user device 104 may be connected to the telecommunication carrier via a communication connection 118 that is established between the user device 104 and the base station node 106(2). For example, the outgoing voice of the user who is using the user device 104 to speak to a remote caller may be carried by the uplink 120 of the communication connection 118. Conversely, the incoming voice of the caller may be carried by the downlink 122 of the communication connection 118. In another example, the user device 104 may request a multimedia stream using the uplink 120, and a server on the Internet 110 may provide the multimedia stream via the downlink 122.

An interruption detection agent 124 may be installed on the user device 104. In various embodiments, the interruption detection agent 124 may be an application that monitors an audio pathway 126 or a video pathway 128 used by applications installed on the user device 104. The audio pathway 126 may refers to a processing path provided by hardware and audio processing software components of the user device that convert audio data packets to audio wave signals that drive one or more audio speakers of the user device 104. Similarly, the video pathway 128 may refer to a processing path provided by hardware and software video processing components of the user device 104 that convert video data packets to video signals that drive a display of the user device 104. For example, a multimedia application may receive data packets from a server via the downlink 122. Audio byte streams information contained in the data packets may be processed by the audio pathway 126 into sound that is played by the audio speakers of the user device 104. Likewise, video byte stream information contained in the data packet may be processed by the video pathway 128 into video that is presented by a display of the user device 104.

By monitoring the audio pathway 126 and the video pathway 128, the interruption detection agent 124 may detect data interruptions to the user device 104 without having root access to the operating system of the user device 104. In alternative instances, the interruption detection agent 124 may monitor data packets that are transmitted and received by specific applications on the user device 104 to detect interruption to the user device 104. However, the monitoring of such data packets may mean that the interruption detection agent 124 has to obtain privileged control, i.e., root access, to the operating system of the user device 104. In some instances, such root access by the interruption detection agent 124 may compromise the overall security of the user device, result in the interruption detection agent 124 becoming a target of hacking. Further, root access by the interruption detection agent 124 may violate the terms of use for the operating system.

The interruption detection agent 124 may determine that a data interruption to the user device 104 happened when particular events occur in the audio pathway 126 or the video pathway 128. One such event may be a zero data state at the audio pathway 126 during a voice call, in which the zero data state lasts for a time period that falls within a predetermined time range. Another event may be a zero data state at the video pathway 128 that occurs within a determined time period of a user interaction with the user device 104.

In other instances, the interruption detection agent 124 may monitor an audio quality of the audio stream transmitted via the audio pathway 126 or the video quality of a video stream transmitted via the video pathway 128. Accordingly, a drop in the audio quality or the video quality may indicate a data interruption to the user device 104. In additional instances, the interruption detection agent 124 may determine that a data interruption occurred when a drop in the video encoding rate of a video stream exceeds a video encoding rate change threshold.

In some embodiments, the interruption detection agent 124 may determine that a data interruption to the user device 104 occurred when a particular event correlates with one or more other indicators. Such indicators may include a decrease in the number of data packets that are received at the user device 104, a loss in the strength of the radio signal that is received by the user device 104 from the carrier network 102, and/or so forth. The interruption detection agent 124 may generate data interruption reports 130 regarding data interruptions 132 in the downlink 122. The data interruption reports 130 may include information such as the duration of the data interruption, identification information of the application receiving data at the time of the interruption, identity of the user device, identification information for the serving base station node, geolocation of the user device at the time of the data interruption, and/or so forth. The interruption detection agent 124 may send the data interruption reports 130 to the analysis engine 116 via the uplink 120. In various embodiments, the data interruptions may have a variety of causes, such as a disruption in the communication connection between the user device 104 and the carrier network 102, a hardware malfunction of the user device 104, or a software error in a communication application installed on the user device 104. Thus, the data interruptions may manifest as intermittent unintentional muting of voice calls, voice call drops, frozen video downloads, stopped audio playback, webpage loading failure, and/or so forth. An unintentional muting of a voice call occurs when the user of the user device 104 at one end of to a voice call is unable to hear any sound transmitted by the other user device of another caller engaged in the voice call even when the other caller has not activated the muting function of the other user device.

The interruption detection agent 124 on the user device 104 may further provide updates to the user of the user device 104. For example, the interruption detection agent 124 may display a message that indicates the data interruption was reported to the telecommunication carrier, so that the user may be assured that the telecommunication carrier will remedy the fault. In another example, the interruption detection agent 124 may display a user interface that enables the user to provide feedback regarding the experience of the user during a data interruption. In some embodiments, the interruption detection agent 124 may also prompt the user device 104 to perform a self-healing functionality. The self-healing functionality may cause the user device 104 to reinitialize a software application (e.g., a multimedia streaming application) or a hardware component (e.g., a device modem) to restore the data communication between the user device 104 and the carrier network 102. The self-healing functionality may be performed by the interruption detection agent 124 in a manner that is hidden from the user of the user device 104, such that the user is unaware that the self-healing took place.

The analysis engine 116 of the telecommunication carrier may aggregate and analyze data interruption reports 130 from multiple user devices to pinpoint one or more sources of the data interruption to the user devices. For example, the analysis may indicate that the data interruption is isolate to a certain group of user devices that are released by particular manufacturer, is associated with a particular base station node, is caused by a specific software application or device hardware component present on one or more user devices, and/or so forth. In some embodiments, the diagnostics engine 116 may further correlate the data interruption reports 130 with user feedback information to further analyze and detect the causes of data interruptions.

In additional embodiments, the base station nodes 106(1)-106(N) may have the ability to detect stoppage or slowdown in the transmission of the data packets to one or more user devices, such as the user device 104. For example, a base station may be equipped with a local analysis engine that aggregates and analyzes the transmission of data packets to multiple user devices. The analysis may reveal localized data transmission patterns that are indicative of network component failures. Such detected stoppages or slowdowns may be used by the telecommunication carrier to verify data interruptions to the one or more user devices or independently detect network component problems that contribute to the data interruptions.

Example User Device Components

Figure 2:
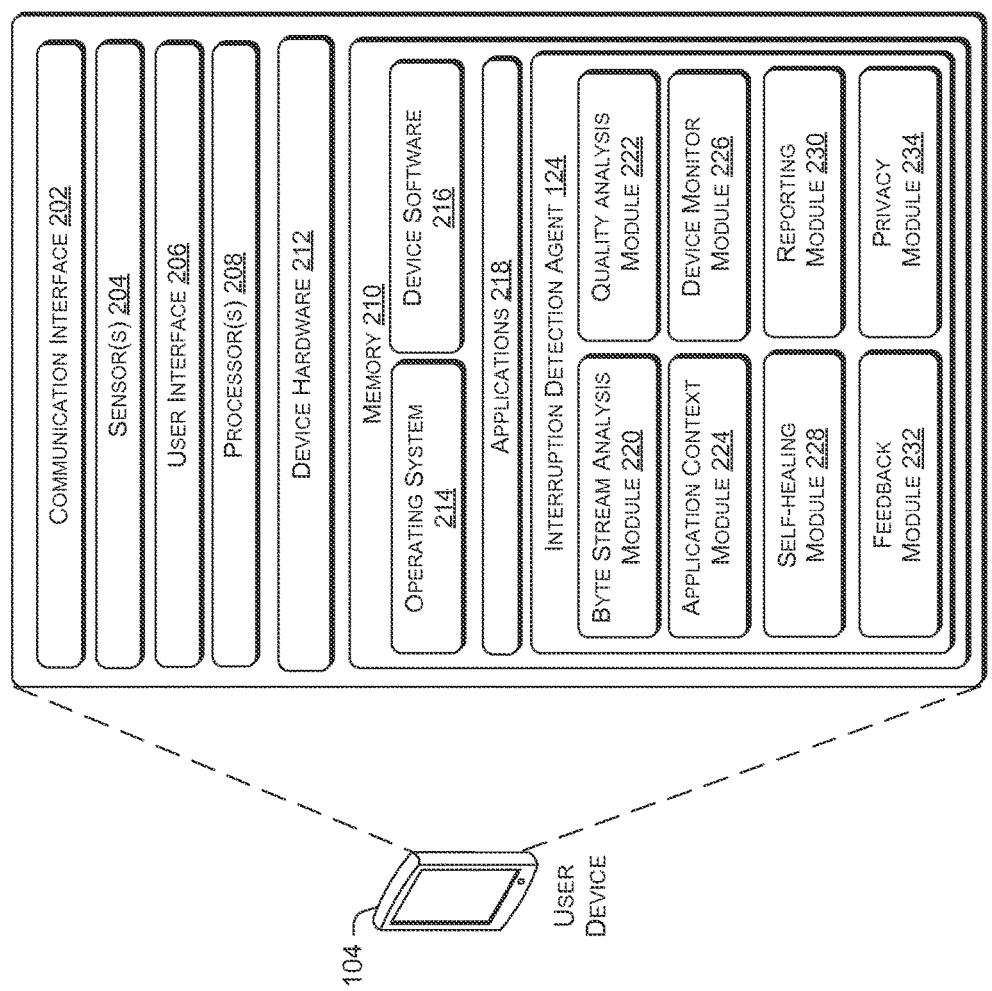
FIG. 2 is a block diagram showing various components of an illustrative user device that supports pathway-based data interruption detection.

FIG. 2 is a block diagram showing various components of an illustrative user device that supports pathway-based data interruption detection. The user device 104 may include a communication interface 202, one or more sensors 204, a user interface 206, one or more processors 208, and memory 210.

The communication interface 202 may include wireless and/or wired communication components that enable the electronic device to transmit or receive voice or data communication via the carrier network 102, as well as other telecommunication and/or data communication networks. The sensors 204 may include a proximity sensor, a compass, an accelerometer, and/or a global positioning system (GPS) sensor. The proximity sensor may detect movement of objects that are proximate the user device 104. The compass, the accelerometer, and the GPS sensor may detect orientation, movement, and geolocation of the user device 104.

The user interface 206 may enable a user to provide inputs and receive outputs from the user device 104. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 212 may include other hardware that is typically located on a user device. For example, the device hardware 212 may include signal converters, antennas, modems, hardware decoders and encoders, graphic processors, a subscriber identity module (SIM) card slot, and/or the like that enable the user device 104 to execute applications and provide telecommunication and data communication functions. A SIM card may be inserted into the SIM card slot of the user device 104. Accordingly, the SIM card may enable the user device 104 to obtain telecommunication and/or data communication services from the telecommunication carrier.

The one or more processors 208 and the memory 210 of the user device 104 may implement an operating system 214, device software 216, one or more applications 218, and the interruption detection agent 124. The operating system 214 may include components that enable the user device 104 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with a modem of the user device 104. Additionally, the operating system 214 may include other components that perform various other functions generally associated with an operating system. The device software 216 may include software components that enable the user device to perform functions and control hardware components of the user device 104.

The applications 218 may include applications that provide utility, entertainment, and/or productivity functionalities to a user of the user device 104. For example, the applications 218 may include telephony applications, electronic mail applications, remote desktop applications, web browser applications, navigation applications, office productivity applications, media streaming applications, and/or so forth.

The interruption detection agent 124 may include a byte stream analysis module 220, a quality analysis module 222, an application context module 224, a device monitor module 226, a self-healing module 228, a reporting module 230, and a feedback module 232. These modules may include routines, program instructions, objects, and/or data structures that perform particular tasks or implement particular abstract data types.

The byte stream analysis module 220 may analyzing the byte stream of the audio pathway 126 and the byte stream of the video pathway 128 to detect data interruptions. The data interruptions may manifest as unintentional intermittent muting of voice calls, voice call drops, frozen video downloads, stopped audio playback, webpage loading failure, and/or so forth. In various embodiments, the byte stream analysis module 220 may tap into the audio pathway 126 or the video pathway 128. For example, the byte stream analysis module 220 may receive or monitor the data values of audio or video byte stream outputs via application program interfaces (APIs) that are provided by the software applications in the pathways. In another example, the byte stream analysis module 220 may tap into a data input queue in the audio pathway or the video pathway to monitor the data value of the byte stream that is passing through the data input queue. Accordingly, the byte stream analysis module 220 may detect zero data states in a pathway. A zero data state is a condition in which no meaningful data is being transmitted through the pathway. Thus, during a zero data state, a byte stream may include a string of zero data values, indicating that the byte stream does not contain discernable audio or video data. Alternatively, a zero date state at a pathway may be a condition in which no data of any kind is received at the pathway. The condition may be caused by a complete lack of data packets reaching the pathway due to disruption in a communication connection (e.g., the downlink 122) between the user device 104 and the carrier network 102.

The byte stream analysis module 220 may detect a time duration of zero data state in the audio pathway 126 during a voice call. The byte stream analysis module 220 may determine that the time duration of zero data state is a data interruption when the time duration falls within a predetermined time length. The predetermined time length may serve to distinguish a data interruption from natural pauses in user speech as well as intentional muting of a voice call. For example, a zero data state that lasts for no more than a minimal time duration may correspond to natural pause in speech. On the other hand, a zero data state that lasts longer than the maximum time duration may indicate a caller has intentionally muted the voice call. In alternative embodiments, the byte stream analysis module 220 may apply the same analysis to audio streaming, as a zero data state that lasts for no more than a minimal time duration may correspond to natural pause in the audio content provided by the audio stream. On the other hand, a zero data state that lasts longer than the maximum time duration may indicate the user has paused the audio stream.

The byte stream analysis module 220 may detect a time duration of zero data state in the video pathway 128 during video streaming or multimedia streaming. The byte stream analysis module 220 may determine that a zero data state is a data interruption when the zero data state occurs for a minimal time duration (e.g., ½ of a second) and within a certain time period (e.g., four seconds) of the user performing an action (e.g., initiating a playback) with respect to the multimedia stream. The minimal time duration may serve to distinguish data interruption from natural lag time between when multimedia content is requested for a server and when the server distributes the multimedia content. The certain time period may serve to distinguish a failure to initiate downloading of the multimedia content due to an intentional action by the user of the user device 104 to temporarily or permanently terminate the downloading (e.g., pausing the multimedia streaming). The time period may be selected based on an assumption the user is unlikely to pause or stop the multimedia streaming right after initiating the multimedia streaming.

The quality analysis module 222 may analyze the quality of the audio that is streamed via the audio pathway 126 and the quality of the video that is streamed via the video pathway 128. In some embodiments, the quality analysis module 222 may use a classifier algorithm to determine that the audio quality or the video quality. The classifier algorithm may continuously generate quality scores for snippets of audio in an audio byte stream or frames of video in a video byte stream. The classifier algorithm may be trained using audio training data or video training data with known quality values. The classifier algorithm may be trained using various approaches, such as supervised learning, unsupervised learning, semi-supervised learning, naïve Bayes, Bayesian networks, decision trees, neural networks, fuzzy logic models, and/or probabilistic classification models. In various embodiments, the classifier algorithm may generate a range of scores that indicate different degrees of audio quality or video quality. For example, a score of "1" may indicate the worst audio or video quality, while a score of "5" may indicate the best audio or video quality.

Accordingly, in some embodiments, the quality analysis module 222 may determine that a data interruption to the user device 104 occurred when the audio quality score or a video quality score for a multimedia stream falls below a quality threshold. In alternative embodiments, the byte stream analysis module 220 may determine that the data interruption occurred when both the audio quality score and the video quality score both drop below corresponding quality thresholds within a predetermine amount of time. However, in still other embodiments, the byte stream analysis module 220 may determine that the data interruption have occurred when the drop of the audio quality score and/or the video quality score is accompanied by one or more other indicators. For example, such indicators may include a decrease in the number of data packets that are received at the user device 104, a loss in the strength of the radio signal that is received by the user device 104 from the carrier network 102, and/or so forth.

In other embodiments, the quality analysis module 222 may monitor the video encoding rate of a video stream or a multimedia stream. Accordingly, the quality analysis module 222 may determine that a data interruption occurred when a decrease in the video encoding rate exceeds a rate of change threshold. The decrease in video encoding rate may manifest as a drop in the video frame rate for the video stream or the multimedia stream over a predetermined time period. In such instances, the video encoding rate threshold may be a frame rate of change threshold. For example, the frame rate of change threshold may be a decrease of 20 frames per second over a two second interval.

Alternatively, the decrease in video encoding rate may manifest as increased image granularity, image pixilation, or other image artifacts in a video frame of the video stream or the multimedia stream. In such instances, the video encoding rate threshold may be an image clarity rate of change threshold, and a trained classifier algorithm may be used by the quality analysis module 222 to obtaining an image clarity score for each frame in a series of frames. Accordingly, the quality analysis module 222 may determine that a data interruption occurred when a rate of change in the image clarity scores exceeds the image clarity rate of change threshold.

In still other embodiments, the decrease in the video encoding rate may manifest as skipped frames in the video stream or the multimedia stream. In such instances, the video encoding rate threshold may be a rate of image discontinuity threshold. The quality analysis module 222 may use a trained classifier algorithm to generate an image discontinuity score for each frame in a series of frames. The image discontinuity score of an image measures the smoothness of the graphical transition from a previous image to the image. Accordingly, the quality analysis module 222 may determine that a data interruption occurred when a rate of change in the image discontinuity scores exceeds the rate of image discontinuity threshold. The various rate of change thresholds may enable the quality analysis module 222 to distinguish a drop in the video encoding rate that is implemented by a dynamic video encoding rate control algorithm of an application from a drop in video encoding rate due to data interruption.

However, in alternative embodiments, the quality analysis module 222 may consider a decrease in the video encoding rate that exceeds the rate of change threshold to indicate a potential data interruption. In such embodiments, the potential data interruption may be considered by quality analysis module 222 to be a true data interruption when the potential data interruption is corroborated by one or more other indicators. For example, such indicators may include a decrease in the number of data packets that are received at the user device 104, a loss in the strength of the radio signal that is received by the user device 104 from the carrier network 102, and/or so forth.

In various embodiments, the quality analysis module 222 may perform the quality and the video encoding rate evaluations by tapping into the audio pathway 126 or the video pathway 128. For example, the quality analysis module 222 may receive audio or video outputs via application program interfaces (APIs) that are provided by the software applications in the pathways.

The application context module 224 may detect application events or user actions with the applications 218. The application events may include the connection of a user device 104 to a carrier network 102 for a voice call, the transmission of a request for an audio stream, a video stream, or a multimedia stream, the download initiation of the audio stream, the video stream, or the multimedia stream. The user interactions may include the activation of the functionalities of the applications. For example, such application functionalities may include browser history back, browser history forward, playback, rewind, fast forward, and/or so forth.

Thus, the application context module 224 may be called by the other modules of the interruption detection agent 124 for application event or user action information. For example, the byte stream analysis module 220 may obtain information regarding the initiation of a playback of a multimedia stream by an application. The information may include a time that the initiation of the stream playback occurred, identification information for the stream, source information for the stream, identity of the application, and/or so forth.

The device monitor module 226 may monitor one or more parameters of the user device 104. A parameter may be the numbers of data packets that are transmitted and received by a modem of the user device 104. Another parameter may be the signal strength of a radio signal that is transmitting the downlink data packets to the user device 104. For example, the signal strength may be measured via various metrics, such as received signal strength indicator (RSSI), received channel power indicator (RCPI), or another type of metric. In various embodiments, the device monitor module 226 may perform such monitor by invoking APIs provided by the operating system 214 of the user device 104.

The self-healing module 228 may activate a self-healing functionality in the event of a data interruption to the user device 104. In some instances, the self-healing functionality may restart a software application, such as a multimedia streaming application. Alternatively or currently, the self-healing functionality may reinitialize a hardware component (e.g., a device modem) to restore the data communication between the user device 104 and the carrier network 102. In some embodiments, the self-healing module 228 may perform the self-healing functionality in a manner that is hidden from the user of the user device 104, such that the user is unaware that the self-healing took place. The self-healing module 228 may perform the self-healing functionality by passing commands to the software application and/or hardware component via the operating system 214.

The reporting module 230 may report data interruptions to the analysis engine 116 via the data interruption reports 130. In some embodiments, the reporting module 230 may generate a data interruption report when prompted by the byte stream analysis module 220 or the quality analysis module 222. The data interruption report may include information such as a time and date of a data interruption, a duration of the data interruption, an identity of the application downloading data at the time of the data interruption, identification information of the user device 104, the geolocation of the user device 104 at the time of the data interruption, and/or so forth. In other embodiments, the reporting module 230 may store information on the incidents of data interruption for a predetermined time period (e.g., an hour, a day, a week, etc.), and transmit the data interruption information to the analysis engine 116 at the end of the predetermined time period. The reporting module 230 may use a communication connection (e.g., the communication connection 118) to send the data interruption reports 130 to the analysis engine 116. In various embodiments, the reporting module 230 may send the data interruption reports via one or more planes of an uplink (e.g., the uplink 120). These planes may include a data plane, a control plane, or a management plane.

The feedback module 232 may provide feedback to the user of the user device 104. In the event of a data interruption, the byte stream analysis module 220 or the quality analysis module 222 may prompt the feedback module 232 to display a message to the user. The message may indicate that a data interruption occurred, and that the data interruption was or will be reported to the telecommunication carrier. Alternatively or concurrently, the feedback module 232 may collect user experience from the user of the user device 104 in the event of a data interruption. The feedback module 232 may provide a user interface menu that enables the user to provide information related to the data interruption. The information may include a user rating of the audio or image clarity, a score indicating user satisfaction with the data service, whether the user is indoors or outdoors during the data interruption, general user comments, etc. In some embodiments, the user interface menu may provide menu components such as sliders, radio buttons, text fields that assist the user in providing feedback information. The feedback module 232 may use a communication connection (e.g., the communication connection 118) to send the user feedback to the analysis engine 116.

The privacy module 234 may provide a user interface that enables the user to select or unselect the type of information that may be collected by the modules of the interruption detection agent 124. For example, the user interface may provide a list of information that the interruption detection agent 124 may send to the analysis engine 116 in the event of a data interruption. The list may include checkboxes that allow a user to designate information that may be reported or excluded from being reported. In this way, user privacy may be protected by the privacy module 234 in the event of a data interruption.

In additional embodiments, at least some of the modules of the interruption detection agent 124 may be implemented on one or more servers, such as the servers 114. In such embodiments, the user device 104 may include an agent application that feeds device states (e.g., byte stream content, user device interactions, device signal strength, etc.) to the servers 114. Accordingly, modules on the servers 114 may analyze the various states of the user device 104 to detect a data interruption. As the servers 114 may possess a greater amount of computation resources, such an implementation may free up device resources of the user device 104 to perform other functions for a user.

Example Server Components

Figure 3:
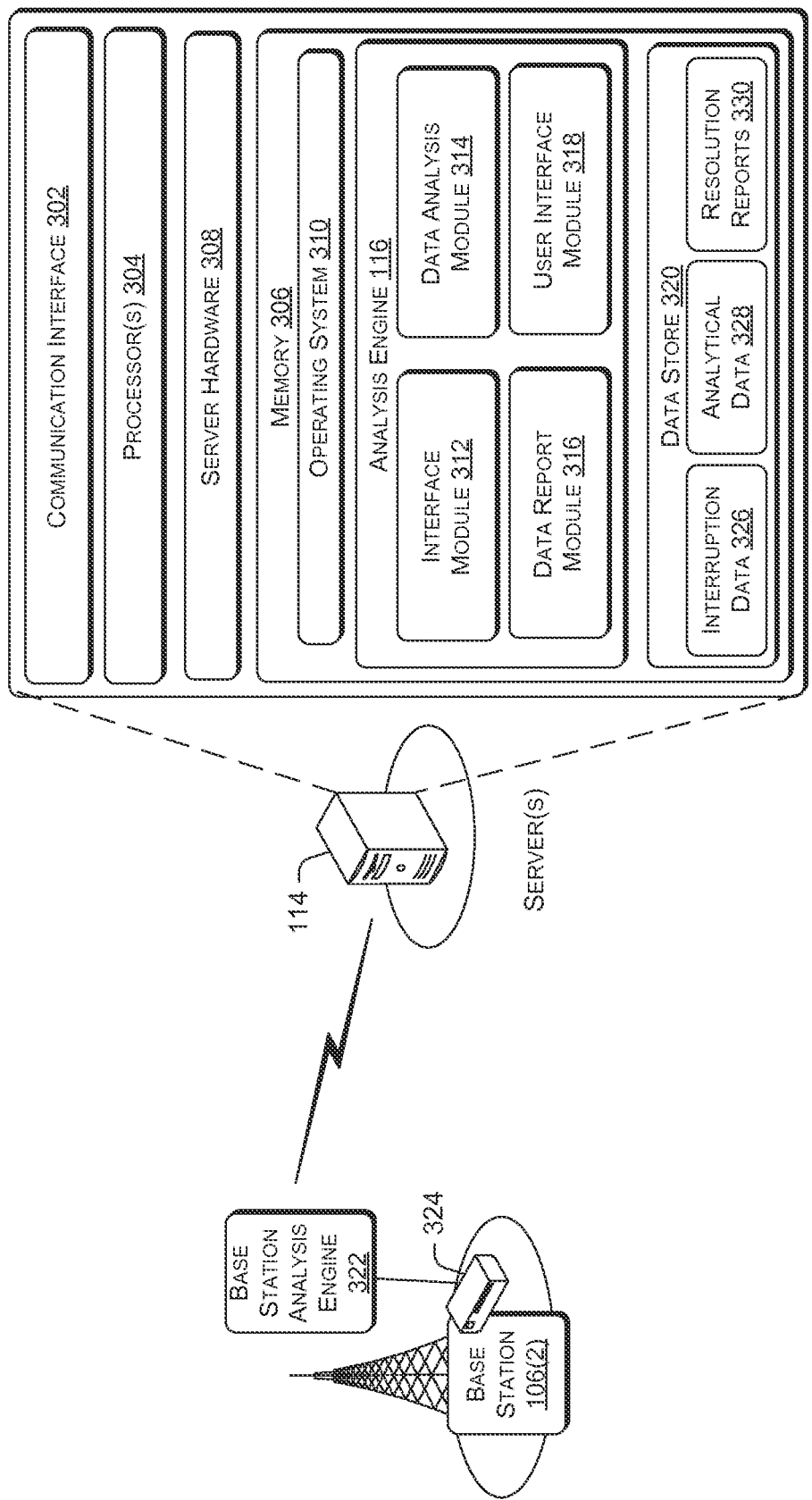
FIG. 3 is a block diagram showing various components of servers at a telecommunication carrier that support pathway-based data interruption detection.

FIG. 3 is a block diagram showing various components of servers at a telecommunication carrier that support pathway-based data interruption detection. The servers 114 may be a part of the core network 108 of the telecommunication carrier. The one or more servers 114 may include a communication interface 302, one or more processors 304, memory 306, and server hardware 308. The communication interface 302 may include wireless and/or wired communication components that enable the servers to transmit data to and receive data from other networked devices via the carrier network 102. The server hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the servers 114 may implement an operating system 310 and the analysis engine 116. The operating system 310 may include components that enable the servers 114 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The analysis engine 116 may include an interface module 312, a data analysis module 314, a data report module 316, and a user interface module 318. The analysis engine 116 may also interact with a data store 320. These modules may include routines, program instructions, objects, and/or data structures that perform particular tasks or implement particular abstract data types.

The interface module 312 may receive data interruption reports from multiple user devices, such as the user device 104. The interface module 312 may receive the data interruption reports via one or more planes of an uplink, such as the uplink 120. These planes may include a data plane, a control plane, or a management plane. The interface module 312 may also receive the data interruption-related user feedbacks from the user devices. The information may include a user rating of the audio or image clarity, a score indicating user satisfaction with the data service, whether the user is indoors or outdoors during the data interruption, general user comments, etc.

The interface module 312 may further receive analysis reports from the analysis engines of the base station nodes, such as the base station analysis engine 322 of the base station node 106(2). The base station analysis engine 322 may be a software application that executes on the computing device 324 of the base station node 106(2). An analysis engine of a base station node may aggregate and analyze the transmission of data packets to multiple user devices from the base station node. The analysis may reveal localized data transmission patterns that are indicative of network stoppages or slowdowns. For example, the analysis may reveal interruptions in the transmission of data packets from a particular third party service provider to the user devices while data packets from other sources are continuously transmitted the user devices. Such a pattern of data transmission may be indicative of a problem with the third party service provider rather than with the carrier network 102 of the telecommunication carrier. In contrast, a disruption to the transmission of all data packets at the base station node 106 may be an indication of a fault with components of the base station node.

The data analysis module 314 may analyze the interruption data that are received via the interface module 312. In various embodiments, the data analysis module 314 may analyze the data using various data mining algorithms. Such data mining algorithms may include a decision tree algorithm, a clustering algorithm, a neural network algorithm, a linear regression algorithm, etc. The analysis may reveal patterns or trends in the data interruptions, such as the data interruptions affecting specific geographical regions, affecting user devices served by specific base state nodes, or affecting user devices at particular times in the day or week. In some instances, the analysis may also forecast future problems with user devices or the carrier network 102 that may cause data interruptions. For example, a network component of the carrier network 102 may be causing more and more data interruptions, which may be a sign that the network component is in a state of imminent failure. The analysis may also capture a sequence of events that leads to a data interruption (e.g., a failure of an application of the user device causing all data communication by other applications to fail), or find common traits between user devices that experienced data interruptions. Accordingly, the data analysis module 314 may pinpoint one or more causes of a data interruption to a user device or data interruptions to multiple user devices. In some examples, the analysis may indicate that the data interruption is isolate to a certain group of user devices that are released by particular manufacturer, communicated with the carrier network 102 a particular base station node. In other examples, the analysis may indicate that the data interruption is caused by a specific software application or device hardware component, is due to a failure of particular network components of the carrier network 102, or is a result of a fault with a third party telecommunication network or service provider.

In some embodiments, user feedback during data interrupted may be used to substantiate the analytical results. For example, the data analysis module 314 may use a correlation algorithm to assign a confidence score to a predicted source of a data interruption. The correlation algorithm may assign the confidence score based on quality of experience ratings that are assigned by users during the data interruption. In some instances, the data analysis module 314 may use statistical analysis to discard user quality experience ratings that are outliers prior to using the ratings to substantiate analytical results. For example, a specific user may be excessively critical of the quality of experience when compared to other users who are similarly situated (e.g., using the same user device in the same geographical area). In such an example, a statistical algorithm may provide reliability scores for rating provided by the specific user. Accordingly, if the reliability score for a rating provided by the specific user meets a predetermined score threshold, the data analysis module 314 may use the rating as a part of the data interruption analysis. Otherwise, if the reliability score for a rating provided by the specific user is below a predetermined score threshold, the data analysis module 314 may mark the rating provided by the specific user as a statistical outlier and discard the rating.

The data report module 316 may generate resolution reports that provide details on the analytical results that are provided by the data analysis module 314. The data report module 316 may route the resolution reports to multiple recipients based on the directions of an administrator. The resolution reports may enable network engineering to correct network problems. The resolution reports may also serve as the basis for customer service staff to troubleshoot or remedy data interruptions experienced by the users of user devices in an expedient manner. In some instances, the reports may be routed to third party service providers to help such providers to resolve problems with their networks or systems that may be causing data interruption to the user devices serviced by the telecommunication carrier.

The user interface module 318 may enable an administrator to interact with the modules of the analysis engine 116 via data input devices and data output devices. For example, the user interface module 318 may enable the administrator to select the type, the amount, or the source of data that is analyzed by the data analysis module 314. In another example, the administrator may also use the user interface module 318 to select the particular type of analysis that is performed on the data. In other examples, the administrator may also use the user interface module 318 to select the specific data that are included in a report, or the particular recipient of a report.

The data store 320 may store data that are used by the various modules of the analysis engine 116. The data store 320 may include one or more databases, such as relational databases, object databases, object-relational databases, and/or key-value databases. In at least some embodiments, the data store 320 may store interruption data 326 that is collected from user devices (e.g., user device 104) and/or base station nodes, such as base station node 106(2). The data store 320 may also store analytical data 328 that are generated by the data analysis module 314, as well as resolution reports 330 that are generated by the data report module 316.

Example Processes

FIGS. 4-10 present illustrative processes 400-1000 for implementing pathway-based data interruption detection. Each of the processes 400-1000 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-1000 are described with reference to the scheme 100 of FIG. 1.

Figure 4:
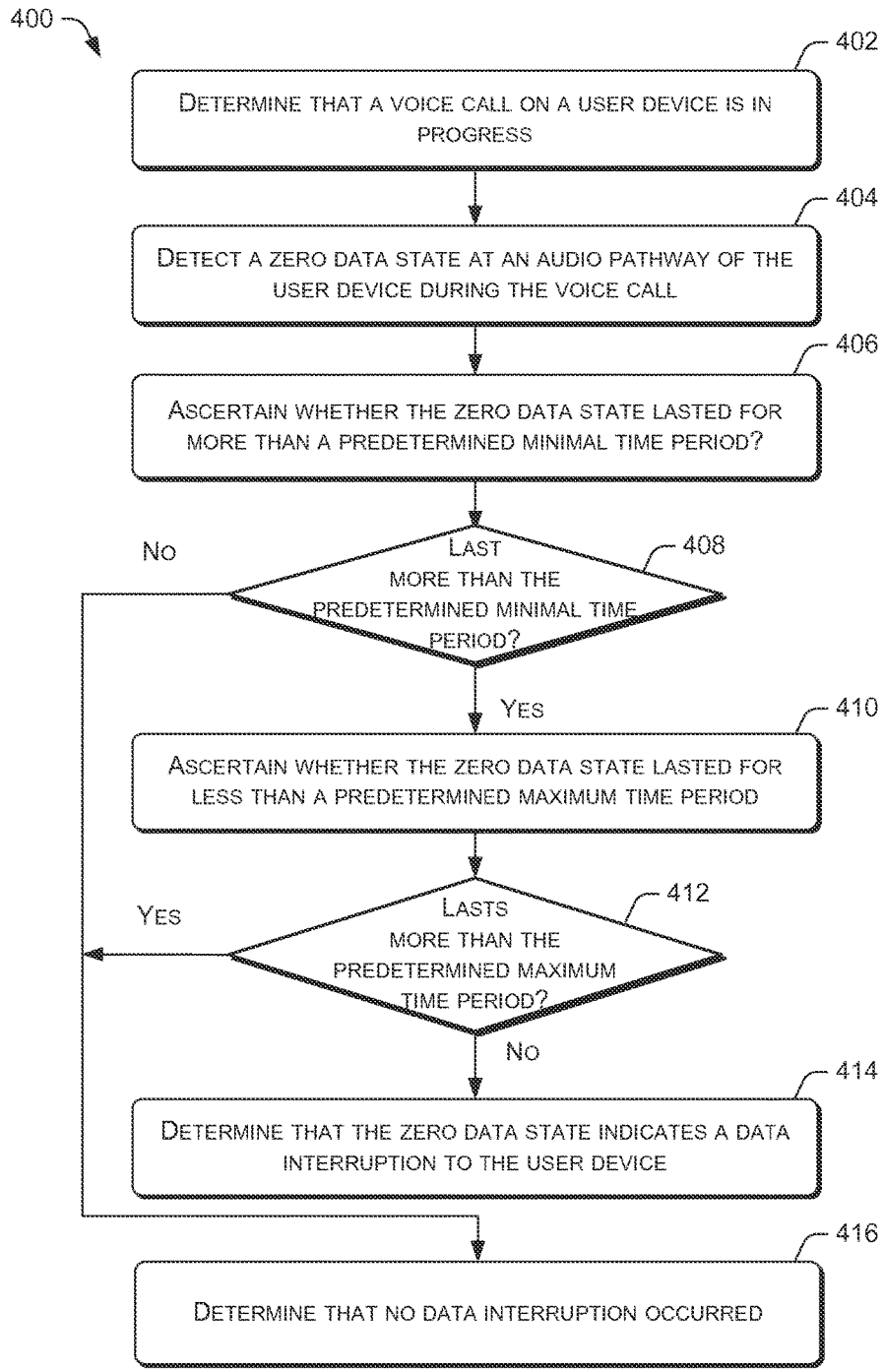
FIG. 4 is a flow diagram of an example process for determining whether a zero data state at an audio pathway of a user device indicates a data interruption to the user device.

FIG. 4 is a flow diagram of an example process 400 for determining whether a zero data state at an audio pathway of a user device indicates a data interruption to the user device. At block 402, an interruption detection agent 124 on the user device 104 may determine that a voice call is in progress. The interruption detection agent 124 may use the application context module 224 to detect that the voice call is in progress. The voice call may include audio data that is transmitted to a carrier network 102 via an uplink 120 and audio data that is received from the carrier network 102 via the downlink 122.

At block 404, the interruption detection agent 124 may detect a zero data state at an audio pathway 126 of the user device 104 during the voice call. A zero data state is a condition in which no meaningful byte stream data is being transmitted through the audio pathway 126.

At block 406, the interruption detection agent 124 may ascertain whether the zero data state lasted for more than a predetermined minimal time period. For example, a zero data state that lasts for no more than the predetermined minimal time period may correspond to natural pause in speech of a remote caller that is engaged in the voice call. At decision block 408, if the interruption detection agent 124 determines that the zero data state lasted for more than the predetermined minimal time period ("yes" at the decision block 408), the process 400 may proceed to block 410.

At block 410, the interruption detection agent 124 may ascertain whether the zero data state lasted for more than a predetermined maximum time period. For example, a zero data state that lasts longer than the predetermined maximum time period may indicate that the caller at the other end has muted the voice call. At decision block 412, if the interruption detection agent 124 determines that the zero data state did not lasts for more than a predetermined maximum time period ("no" at decision block 412), the process 400 may proceed to block 414. At block 414, the interruption detection agent 124 may determine that the zero data state indicates a data interruption to the user device 104. In some embodiments, the data interruption may manifest as an unintentional muting of a voice call or a drop of the voice call. For example, the unintentional muting of a voice call or the drop of the voice call may be caused by a disruption in the communication connection between user device and a carrier network.

Returning to decision block 408, if the interruption detection agent 124 determines that the zero data state did not last for more than the predetermined minimal time period ("no" at the decision block 408), the process 400 may proceed to block 416. At block 416, the interruption detection agent 124 may determine that no data interruption to the user device 104 occurred. Returning to decision block 412, if the interruption detection agent 124 determines that the zero data state lasted for more than the predetermined maximum time period ("yes" at the decision block 408), the process 400 may also proceed to block 416.

In alternative embodiments, the interruption detection agent 124 may forego the actions in block 410, and directly determine that the zero data state indicates a data interruption as long as the interruption detection agent 124 determines that the zero data state lasted for more than the predetermined minimal time period.

Figure 5:
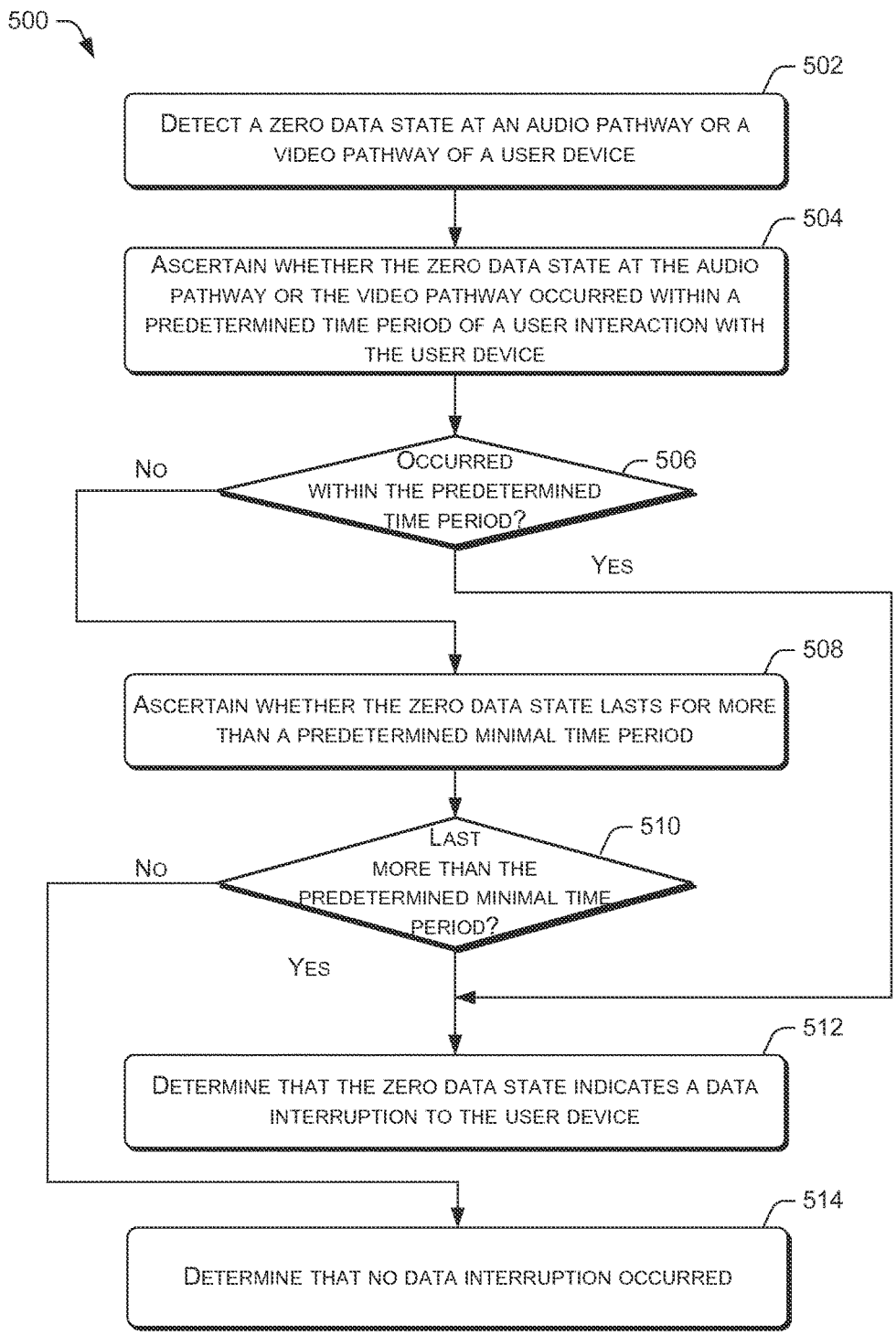
FIG. 5 is a flow diagram of an example process for determining whether a zero data state at an audio pathway or a video pathway of a user device indicates a data interruption to the user device.

FIG. 5 is a flow diagram of an example process 500 for determining whether a zero data state at an audio pathway or a video pathway of a user device indicates a data interruption to the user device. At block 502, the interruption detection agent 124 on a user device 104 may detect a zero data state at the audio pathway 126 or the video pathway 128 of the user device. The interruption detection agent 124 may make the detection during audio streaming of content to the user device 104, video streaming of content to the user device 104, a multimedia streaming of content to the user device 104, a video teleconference call, etc. In the case of the video teleconference call, the interruption detection agent 124 may use the application context module 224 to detect that the call or the video streaming.

At block 504, the interruption detection agent 124 may ascertain whether the zero data state occurred within a predetermined time period of a user interaction with the user device 104. The user interactions may include browser history back, browser history forward, playback, rewind, fast forward, and/or so forth. Thus, a zero data state that occurs within the predetermined time period may indicate that the user device 104 was unable to obtain audio data or video data from a server because data download to the user device 104 was disrupted.

Thus, at decision block 506, if the interruption detection agent 124 determines that the zero data state occurred within the predetermined time period of the user interaction ("yes" at decision block 506), the process 500 may proceed to block 512. At block 512, the interruption detection agent 124 may determine that the zero data state indicates a data interruption to the user device 104.

However, if the interruption detection agent 124 determines that the zero data state did not occur within the predetermined time period of the user interaction ("no" at the decision block 506), the process 500 may proceed to block 508. At block 508, the interruption detection agent 124 may ascertain whether the zero data state lasted for more than a predetermined minimal time period. For example, a zero data state that lasts for no more than the predetermined minimal time period may correspond to an interlude (e.g., a song change) in the audio content that is being provided to the user device 104. In another example, a zero data state that lasts for no more than the predetermined minimal time period may correspond to natural break (e.g., a scene change) in the video content that is being provided to the user device 104. At decision block 510, if the interruption detection agent 124 determines that the zero data state lasted for more than the predetermined minimal time period ("yes" at the decision block 510), the process 500 may proceed to block 512. At block 512, the interruption detection agent 124 may determine that the zero data state indicates a data interruption to the user device 104.

Returning to decision block 510, if the interruption detection agent 124 determines that the zero data state did not last for more than the predetermined minimal time period ("no" at the decision block 510), the process 500 may proceed to block 514. Once again, at block 514, the interruption detection agent 124 may determine that no data interruption to the user device 104 occurred.

In alternative embodiments, the determination of whether the zero data state occurred within a predetermined time period of a user interaction with the user device as described in blocks 504 and 506 may be eliminated. In such embodiments, the interruption detection agent 124 may determine that a data interruption to the user device 104 occurred when the zero data state at the audio pathway 126 or the video pathway 128 lasts for more than the predetermined minimal time period.

Figure 6:
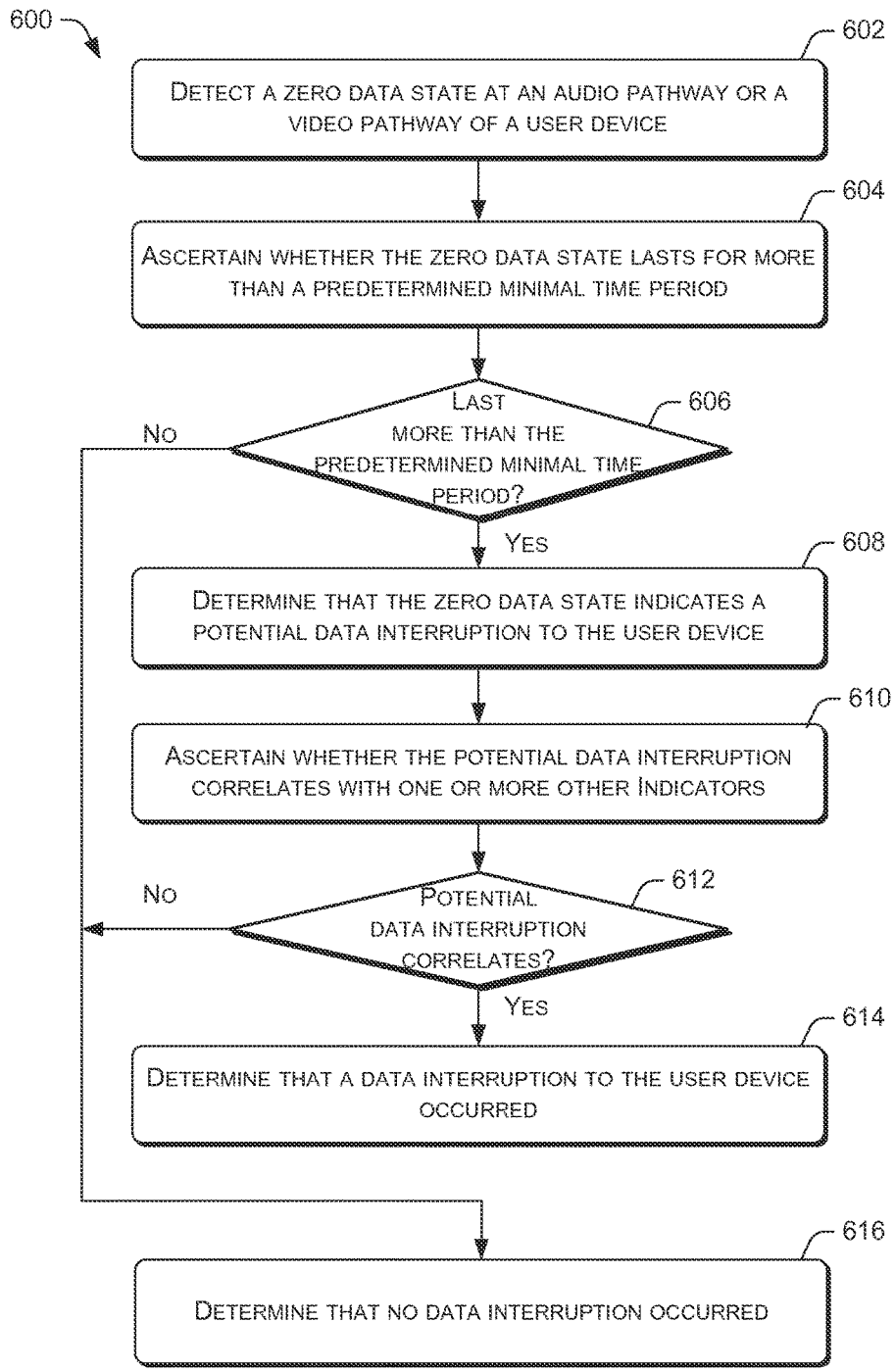
FIG. 6 is a flow diagram of an example process for determining whether a zero data state at an audio pathway or a video pathway of a user device indicates data interruption to the user device.

FIG. 6 is a flow diagram of an example process 600 for determining whether a zero data state at an audio pathway or a video pathway of a user device indicates data interruption to the user device. At block 602, the interruption detection agent 124 on the user device 104 may detect a zero data state at the audio pathway 126 or the video pathway 128 of the user device. The interruption detection agent 124 may make the detection during a voice call, a video streaming of content to the user device 104, a multimedia streaming of content to the user device 104, a video teleconference call, etc. The interruption detection agent 124 may use the application context module 224 to detect the calls or the streaming.

At block 604, the interruption detection agent 124 may ascertain whether the zero data state lasted for more than a predetermined minimal time period. For example, a zero data state that lasts for no more than the predetermined minimal time period may correspond to a pause in a voice call, a natural break in the video content (e.g., scene change), or so forth. At decision block 606, if the interruption detection agent 124 determines that the zero data state lasted for more than the predetermined minimal time period ("yes" at the decision block 606), the process 600 may proceed to block 608. At block 608, the interruption detection agent 124 may determine that the zero data state indicates a potential data interruption to the user device.

At block 610, the interruption detection agent 124 may ascertain whether the potential data interruption correlates with one or more other indicators that occurred. In various embodiments, the indicators may include a decrease in the number of data packets that are received at the user device 104, a loss in the strength of the radio signal that is received by the user device 104 from the carrier network 102, and/or so forth. The interruption detection agent 124 may use the device monitor module 226 to determine whether such corroborating indicators exist. An indicator is a corroborating indicator when it occurs at the same time or approximate the same time as the potential data interruption.

Thus, at decision block 612, if the interruption detection agent 124 that the potential data interruption correlates with one or more other indicators ("yes" at decision block 612), the process 600 may proceed to block 614. At block 614, the interruption detection agent 124 may determine that a data interruption to the user device 104 occurred.

However, if the interruption detection agent 124 determines at decision block 612 that the potential data interruption does not correlate with one or more indicators ("no" at decision block 612), the process 600 may proceed to block 616. At block 616, the interruption detection agent 124 may determine that no data interruption to the user device 104 occurred.

Returning to decision block 606, if the interruption detection agent 124 determines that the zero data state did not last for more than the predetermined minimal time period ("no" at the decision block 606), the process 600 may proceed directly to block 616. At block 616, once again, the interruption detection agent 124 may determine that no data interruption to the user device 104 occurred.

Figure 7:
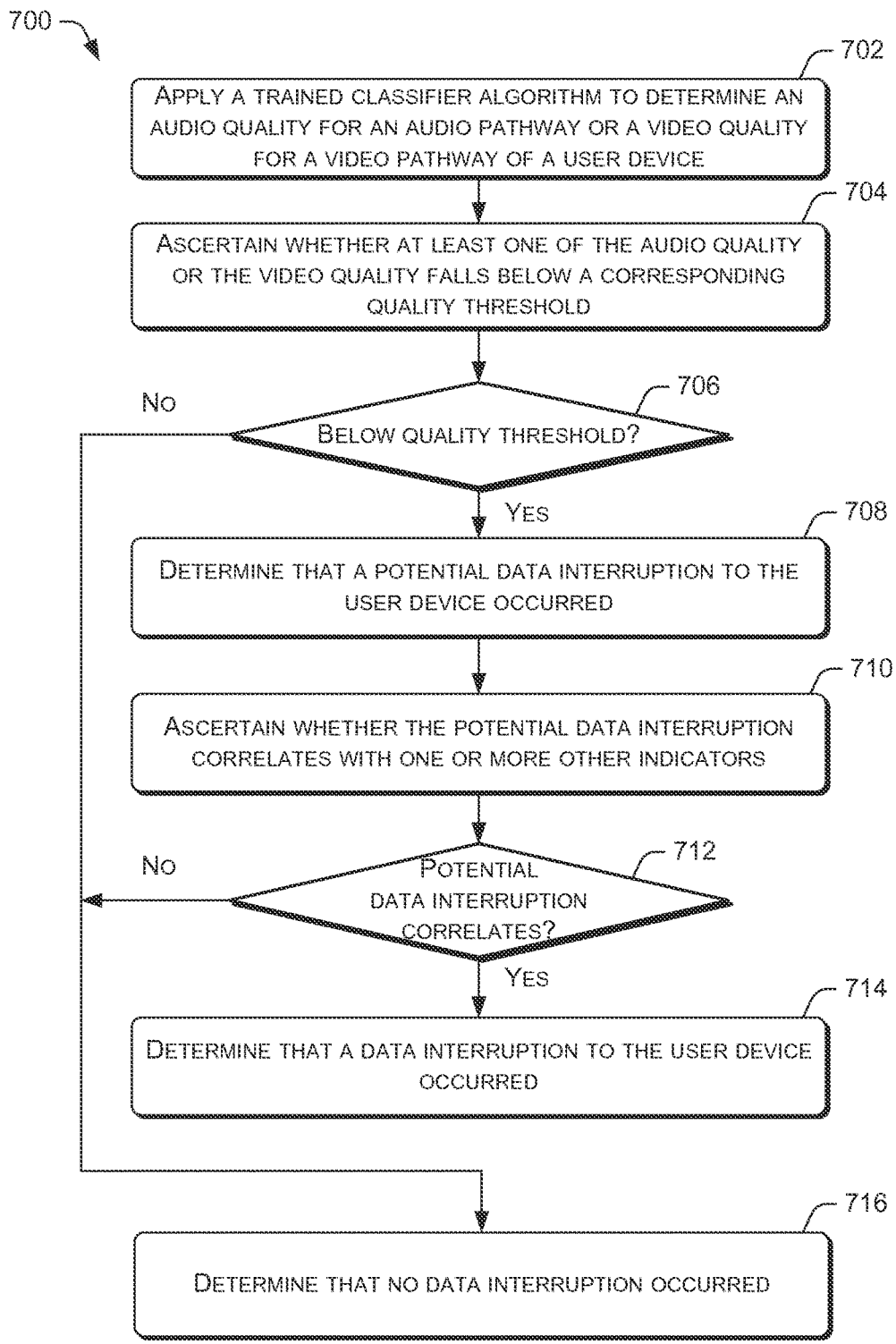
FIG. 7 is a flow diagram of an example process for determining whether degradation in an audio quality or a video quality indicates a data interruption to the user device.

FIG. 7 is a flow diagram of an example process 700 for determining whether degradation in an audio quality or a video quality indicates a data interruption to the user device.

At block 702, the interruption detection agent 124 may apply a trained classifier algorithm to determine an audio quality for the audio pathway 126 or a video quality for the video pathway 128 of the user device 104. In various embodiments, the classifier algorithm may continuously generate quality scores for snippets of audio in an audio byte stream of the audio pathway 126 or frames of video in a video byte stream of the video pathway 128. The classifier algorithm may be trained using audio training data or video training data with known quality scores.

At block 704, the interruption detection agent 124 may ascertain whether at least one of the audio quality or the video quality falls below a corresponding quality threshold. In various embodiments, a drop in the audio quality and/or the video quality below corresponding quality thresholds may indicate a data interruption to the user device 104. Thus, if the interruption detection agent 124 determines that at least one of the audio quality or the video quality dropped below a corresponding threshold ("yes" at decision block 706), the process 700 may proceed to block 708. At block 708, the interruption detection agent 124 may determine that a potential data interruption to the user device 104 occurred.

At block 710, the interruption detection agent 124 may ascertain whether the potential data interruption correlates with one or more other indicators. In various embodiments, the indicators may include a decrease in the number of data packets that are received at the user device 104, a loss in the strength of the radio signal that is received by the user device 104 from the carrier network 102, and/or so forth. The interruption detection agent 124 may use the device monitor module 226 to determine whether such corroborating indicators exist. An indicator is a corroborating indicator when it occurs at the same time or approximate the same time as the potential data interruption.

Thus, at decision block 712, if the interruption detection agent 124 that the potential data interruption correlates with one or more other indicators ("yes" at decision block 712), the process 700 may proceed to block 714. At block 714, the interruption detection agent 124 may determine that a data interruption to the user device 104 occurred.

However, if the interruption detection agent 124 determines at decision block 712 that the potential data interruption does not correlate with one or more indicators ("no" at decision block 712), the process 700 may proceed to block 716. At block 716, the interruption detection agent 124 may determine that no data interruption to the user device 104 occurred.

Returning to decision block 706, if the interruption detection agent 124 determines that none of the audio quality or the video quality dropped below a corresponding threshold ("no" at decision block 706), the process 700 may proceed to block 716. At block 716, once again, the interruption detection agent 124 may determine that no data interruption to the user device 104 occurred.

In alternative embodiments, the correlation of a potential data interruption with one or more other indicators as described in blocks 710 and 712 may be eliminated. In such embodiments, the interruption detection agent 124 may determine that a data interruption to the user device 104 occurred when a drop in the audio quality and/or the video quality below corresponding quality thresholds occurs.

Figure 8:
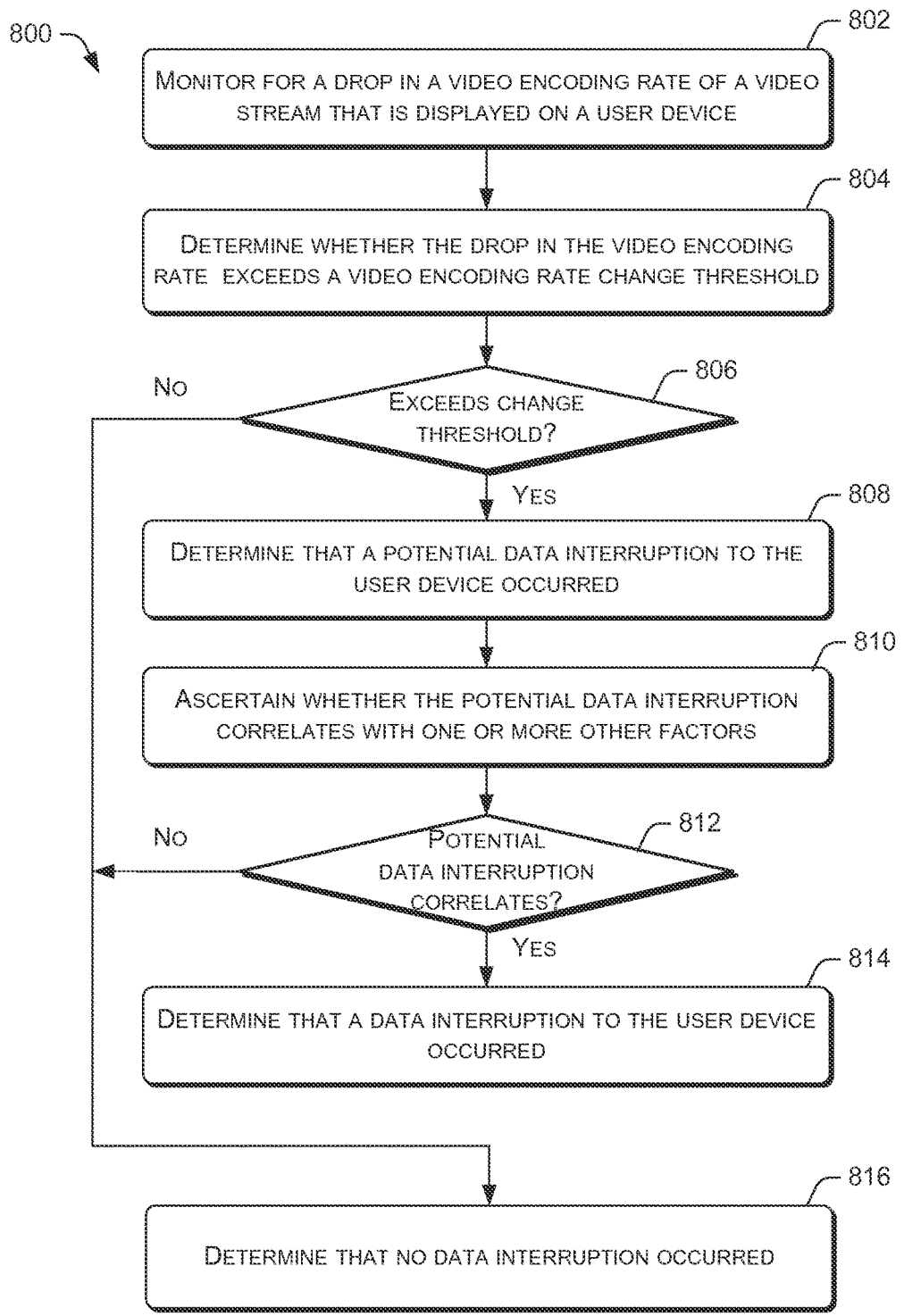
FIG. 8 is a flow diagram of an example process for determining whether a change in a video encoding rate of a video indicates a data interruption to the user device.

FIG. 8 is a flow diagram of an example process 800 for determining whether a change in a video encoding rate of a video indicates a data interruption to the user device. At block 802, the interruption detection agent 124 may monitor for a drop in a video encoding rate of a video stream that is displayed on the user device 104. The video stream may be displayed via the video pathway 128 of the user device 104. The video stream may be part of a video teleconference call, a multimedia stream, etc.

At block 804, the interruption detection agent 124 may determine whether the drop in the video encoding rate exceeds a encoding rate change threshold. For example, the rate of change threshold may be a decrease of 20 frames per second over a two second interval. The rate of change threshold may enable the interruption detection agent 124 to distinguish a drop in a video encoding rate that is implemented by the dynamic video encoding rate control algorithm of an application from a drop in video encoding rate due to data interruption.

At decision block 806, if the interruption detection agent 124 determines that the drop in video encoding rate exceeds the rate of change threshold ("yes" at decision block 806), the process 800 may proceed to block 808. At block 808, the interruption detection agent 124 may determine that a potential data interruption to the user device 104 occurred.

At block 810, the interruption detection agent 124 may ascertain whether the potential data interruption occurred at same time or near the same time. In various embodiments, the indicators may include a decrease in the number of data packets that are received at the user device 104, a loss in the strength of the radio signal that is received by the user device 104 from the carrier network 102, and/or so forth. The interruption detection agent 124 may use the device monitor module 226 to determine whether such corroborating indicators exist. An indicator is a corroborating indicator when it occurs at the same time or approximate the same time as the potential data interruption.

Thus, at decision block 812, if the interruption detection agent 124 that the potential data interruption correlates with one or more other indicators ("yes" at decision block 812), the process 800 may proceed to block 814. At block 814, the interruption detection agent 124 may determine that a data interruption to the user device 104 occurred.

However, if the interruption detection agent 124 determines at decision block 812 that the potential data interruption does not correlate with one or more indicators ("no" at decision block 812), the process 800 may proceed to block 816. At block 816, the interruption detection agent 124 may determine that no data interruption to the user device 104 occurred.

Returning to decision block 806, if the interruption detection agent 124 determines that the drop in the video encoding rate does not exceed the rate of change threshold ("no" at decision block 806), the process 800 may proceed directly to block 816. At block 816, once again, the interruption detection agent 124 may determine that no data interruption to the user device 104 occurred.

In alternative embodiments, the correlation of a potential data interruption with one or more other indicators as described in blocks 810 and 812 may be eliminated. In such embodiments, the interruption detection agent 124 may determine that a data interruption to the user device 104 occurred when a drop in the video encoding rate exceeds the rate of change threshold.

Figure 9:
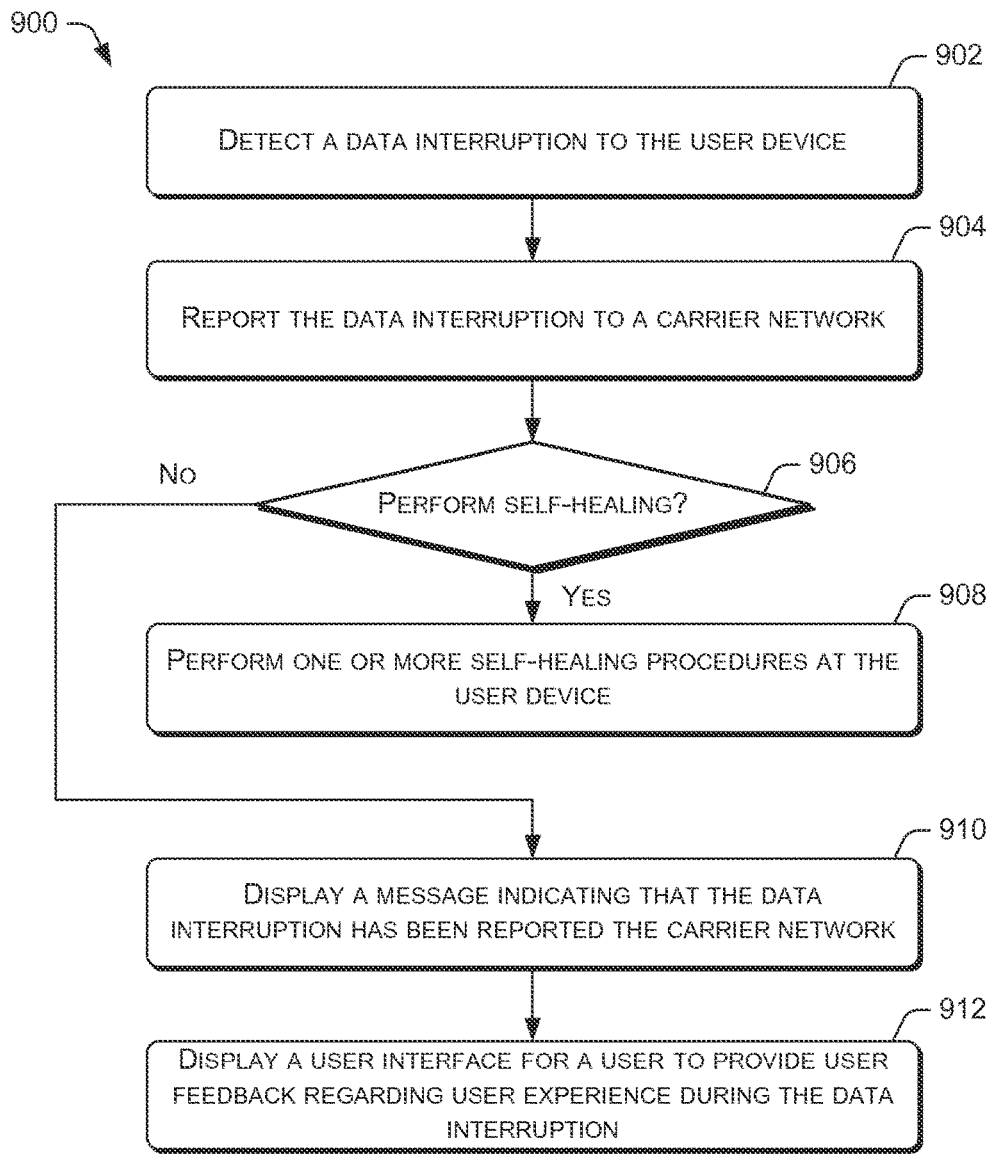
FIG. 9 is a flow diagram of an example process for performing remediation actions in response to the detection of a data interruption to the user device.

FIG. 9 is a flow diagram of an example process 900 for performing remediation actions in response to the detection of a data interruption to the user device. At block 902, the interruption detection agent 124 may detect a data interruption to the user device 104. In various embodiments, the interruption detection agent 124 may monitor the audio pathway 126 or the video pathway 128 of the user device 104 to detect the data interruption. The data interruption may be manifested as a zero data state or a drop in a quality of the audio byte stream and/or the video byte stream.

At block 904, the interruption detection agent 124 may report the data interruption to a carrier network, such as the carrier network 102 of the telecommunication carrier. The interruption detection agent 124 may use a data interruption report to provide details regarding the data interruption to the telecommunication carrier. The details may include information such as the duration of the data interruption, identification information of the application receiving data at the time of the interruption, identity of the user device, the serving base station node, and/or so forth.

At decision block 906, the interruption detection agent 124 may determine whether a self-healing is to be performed. In various embodiments, the decision of whether to perform the self-healing may be made based on a configuration setting of the user device 104, a signal from the analysis engine 116, or a prior user response to a prompt generated by the self-healing module 228 of the interruption detection agent 124.

Thus, if self-healing is to be performed ("yes" at decision block 906), the process 900 may proceed to block 908. At block 908, the interruption detection agent 124 may initiate a self-healing functionality for the user device 104. In various embodiments, the self-healing functionality may cause the user device 104 to reinitialize a software application (e.g., a multimedia streaming application) or a hardware component (e.g., a device modem) to restore the data communication between the user device 104 and the carrier network 102. In some embodiments, the self-healing functionality may be performed by the interruption detection agent 124 in a manner that is hidden from the user of the user device 104, such that the user is unaware that the self-healing took place.

However, if self-healing is not be performed ("no" at decision block 906), the process 900 may proceed to block 910. At block 910, the interruption detection agent 124 may cause the user device 104 to display a message to a user indicating that the data interruption has been reported to the carrier network 102 of the telecommunication carrier. In this way, the user may be assured that the telecommunication carrier will remedy the fault that caused the data interruption.

At block 912, the interruption detection agent 124 may display a user interface for a user to provide user feedback regarding user experience during the data interruption. In various embodiments, the user feedback may include a user rating of the audio or image clarity, a score indicating user satisfaction with the data service, whether the user is indoors or outdoors during the data interruption, general user comments, etc.

Figure 10:
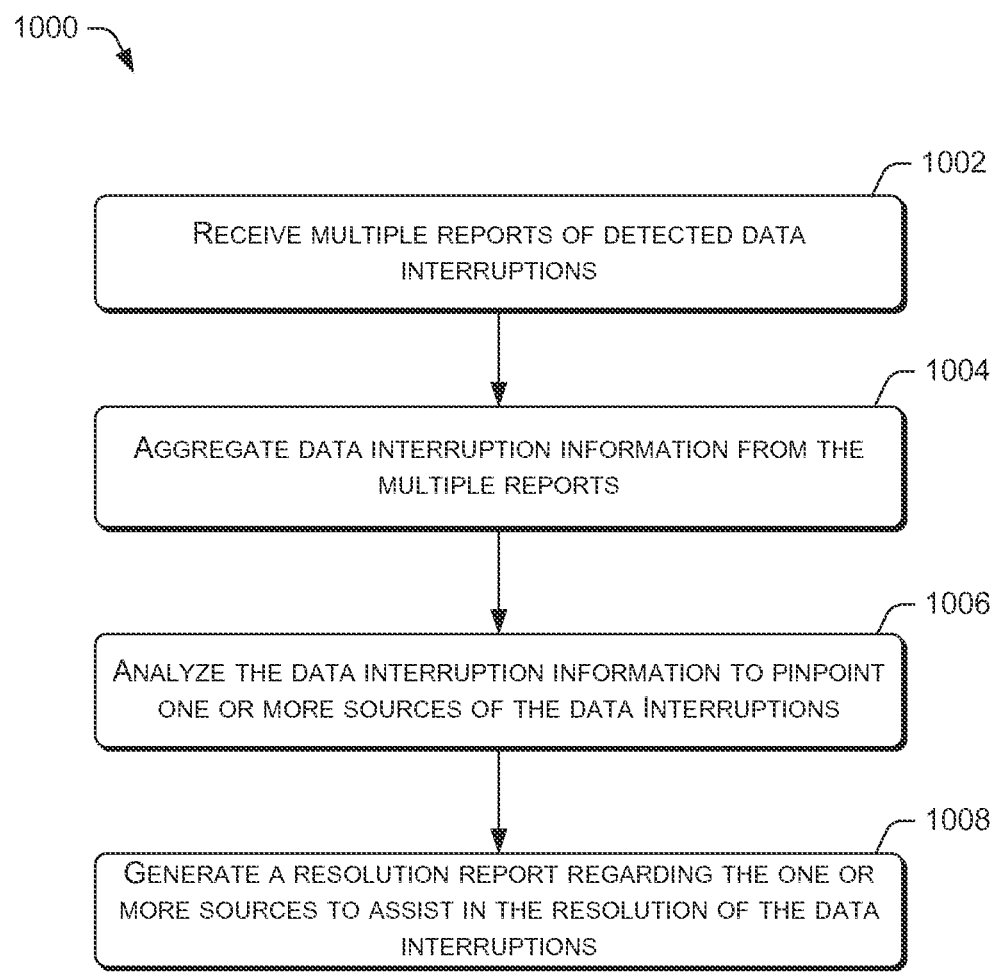
FIG. 10 is a flow diagram of an example process for analyzing multiple automatic reports of data interruption from user devices to generate a data interruption report.

FIG. 10 is a flow diagram of an example process 1000 for analyzing multiple automatic reports of data interruption from user devices to generate a data interruption report. At block 1002, the analysis engine 116 on the servers 114 may receive multiple reports of detected data interruptions, such as the data interruption reports 130. The reports may be automatically generated by one or more user devices and/or one or more base station nodes. Each of the data interruption reports may include information such as the duration of a data interruption, identification information of the application receiving data at the time of the data interruption, identity of the user device, the serving base station node, and/or so forth. In some instances, the analysis engine 116 may also receive the data interruption reports from base station nodes.

At block 1004, the analysis engine 116 may aggregate the data interruption information from the multiple reports and the other sources. In various embodiments, the aggregation of the information may include organizing the information according to multiple classes and storing the organized information in a data store, such as the data store 320.

At block 1006, the analysis engine 116 may analyze the data interruption information to pinpoint one or more sources of the data interruptions. The analysis may be performed using one or more data mining algorithms. In some embodiments, the analysis to pinpoint the one or more sources may include correlating reported data interruptions with user feedback regarding user quality of experience during the reported data interruptions. Accordingly, the analysis may indicate that the data interruption is isolate to a certain group of user devices that are released by particular manufacturer, associated with a particular base station node, is caused by a specific software application or device hardware component, and/or so forth. In other examples, the analysis may indicate that the data interruptions may be caused by a network component of the carrier network 102 or a third party service provider.

At block 1008, the analysis engine 116 may generate a resolution report on the one or more sources of data interruptions to assist in the resolution of the data interruptions. The resolution report may provide details on the analytical results on the one or more sources of the data interruptions. The resolution report may also concurrently provide recommendations for fixing the one or more sources of the data interruptions. The resolution report may enable network engineering to correct network problems. The resolution report may also serve as the basis for customer service staff to troubleshoot or remedy data interruptions experienced by the users of user devices in an expedient manner.

The techniques may enable a telecommunication carrier to automatically receive reports of the data interruption from user devices. The aggregation and analysis of such reports may reveal patterns and trends that pinpoint the source of the data interruption. The ability to quickly pinpoint problems may enable the telecommunication carrier to remedy the cause of the data interruption before the interruption becomes more disruptive or widespread. Thus, the techniques may alleviate expenses incurred by customer support centers in taking in outage reports, as well as reduce technical troubleshooting time and complexity experienced by network engineers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   receiving, at one or more computing devices of a carrier network, at least one report of detected data interruptions of data communication between a carrier network and a user device, the detected data interruptions including a data interruption to the user device that is detected by an agent application on the user device that monitors at least one of an audio pathway or a video pathway of the user device;
   receiving, at the one or more computing devices, a report of one or more additional data interruptions to the user device that is provided by an analysis engine at a base station node of the carrier network, the analysis engine detecting the one or more additional data interruptions by independently analyzing transmission of data packets from the base station node to a plurality of user devices, the one or more additional data interruptions being different from the data interruption detected by the agent application on the user device;
   aggregating, at the one or more computing devices, the at least one report of the detected data interruptions received from the user device and the report of the one or more additional data interruptions from the base station node of the carrier network into data interruption information; and
   analyzing, at the one or more computing devices, the data interruption information that includes at least one report of the detected data interruptions from the user device and the report of the one or more additional data interruptions from the base station node to pinpoint one or more sources of a detected data interruption.

2. The computer-implemented method of claim 1, further comprising generating, via the one or more computing devices, a resolution report that includes a resolution for remedying the one or more sources of the detected data interruption.

3. The computer-implemented method of claim 1, further comprising receiving user feedback inputted by a user regarding a quality of experience at a time of the data interruption to the user device, wherein the analyzing includes analyzing the data interruption information and the user feedback to pinpoint one or more sources of the detected data interruption.

4. The computer-implemented method of claim 3, wherein the analyzing includes analyzing the data interruption information and the user feedback in response to a statistical analysis indicating that a reliability score for the user feedback is above a predetermined reliability score threshold.

5. The computer-implemented method of claim 3, wherein the user feedback includes at least one of a user rating of audio clarity or a user rating of image clarity.

6. The computer-implemented method of claim 1, wherein the audio pathway is provided by hardware and software audio processing components of the user device that convert audio data packets received by the user device to audio wave signals that drive one or more audio speakers of the user device, and wherein the video pathway is provided by hardware and software video processing components of the user device that convert video data packets received by the user device to video signals that drive a display of the user device.

7. The computer-implemented method of claim 1, wherein the analyzing reveals a pattern in the detected data interruptions, forecasts future problems with multiple user devices or the carrier network that cause additional data interruptions, captures a sequence of events that leads to a data interruption, or finds common traits between the multiple user devices that experienced the detected data interruptions.

8. The computer-implemented method of claim 1, wherein the one or more sources of the detected data interruptions include a network component of the carrier network, a component of a third party service provider, a hardware component of a user device, or a software component of the user device.

9. One or more computer-readable media storing computer-executable instructions that upon execution cause one or more processors to perform acts comprising:
   receiving a report from an agent application on a user device that indicates a data interruption in a flow of data from a carrier network to the user device during downloading of audio or video data by the user device from a carrier network;
   receiving a report of one or more additional data interruptions to at least one user device that is detected by an analysis engine at a base station node of the carrier network, the analysis engine detecting the one or more additional data interruptions by independently analyzing transmission of data packets from the base station node to a plurality of user devices, the one or more additional data interruptions being different from the data interruption detected by the agent application on the user device;

aggregating the data interruption determined to interrupt the flow of data to the user device with the report of the one or more additional data interruptions from base station node of the carrier network into data interruption information; and analyzing the data interruption information that includes the data interruption and the report of the one or more additional data interruptions from the base station node to pinpoint one or more sources of the data interruption in the flow of data.

10. The one or more computer-readable media of claim 9, wherein the data interruption is reported by the agent application at least in response to an audio quality of an audio pathway during audio data downloading or a video quality of a video pathway during video data downloading as determined by a trained classifier algorithm dropping below a corresponding quality threshold.

11. The one or more computer-readable media of claim 10, wherein the data interruption is reported by the agent application in response to a drop of the audio quality or the video quality below a corresponding quality threshold being correlated to one or more additional indicators, the one or more additional indicators including a decrease in a number of data packets that are received at the user device or a loss in a strength of a radio signal that is received by the user device.

12. The one or more computer-readable media of claim 9, wherein the data interruption is reported by the agent application in response to a drop in the video encoding rate for a video pathway of the user device during video downloading by the user device from the carrier network being correlated to one or more additional indicators, the one or more additional indicators including a decrease in a number of data packets that are received at the user device or a loss in a strength of a radio signal that is received by the user device.

13. The one or more computer-readable media of claim 9, wherein the data interruption is reported by the agent application in response to a zero data state in an audio pathway or a video pathway of the user device that lasts for more than a predetermined minimal time period.

14. The one or more computer-readable media of claim 9, wherein the data interruption is reported by the agent application in response to a zero data state in an audio pathway of the user device lasting for a duration that is between a predetermined minimal time period and a predetermined maximum time period.

15. The one or more computer-readable media of claim 14, wherein the zero data state in the audio pathway of the user device occurred during a voice call.

16. The one or more computer-readable media of claim 9, wherein the data interruption is reported by the agent application in response to a zero data state in an audio pathway or a video pathway of the user device lasting for more than a predetermined minimal time period and the zero data state occurring within a predetermined time period of a user interaction with the user device.

17. The one or more computer-readable media of claim 9, wherein the data interruption is report by the agent application in response to a zero data state in an audio pathway or a video pathway of the user device being further correlated to one or more additional indicators, the one or more additional indicators including a decrease in a number of data packets that are received at the user device or a loss in a strength of a radio signal that is received by the user device.

18. A system, comprising:
one or more processors; and
memory having instructions stored therein, the instructions, when executed by the one or more processors, cause the one or more processors to perform acts comprising:
receiving at least one report of detected data interruptions of data communication between a carrier network and one or more user devices, the detected data interruptions including a data interruption to a user device that is detected by an agent application on the user device that monitors at least one of an audio pathway or a video pathway of the user device;
receiving a report of one or more additional data interruptions to at least one user device that is detected by an analysis engine at a base station node of the carrier network, the analysis engine detecting the one or more additional data interruptions by independently analyzing transmission of data packets from the base station node to a plurality of user devices, the one or more additional data interruptions being different from the data interruption detected by the agent application on the user device;
aggregating the at least one report of the detected data interruptions received from the one or more user devices and the report of the one or more additional data interruptions from the base station node of the carrier network into data interruption information; and
analyzing the data interruption information that includes at least one report of the detected data interruptions from the one or more user devices and the report of the one or more additional data interruptions from the base station node to pinpoint one or more sources of a detected data interruption, the one or more sources of the detected data interruption includes a network component of the carrier network, a component of a third party service provider, a hardware component of a user device, or a software component of the user device.

19. The system of claim 18, wherein the audio pathway is provided by hardware and software audio processing components of the user device that convert audio data packets received by the user device to audio wave signals that drive one or more audio speakers of the user device, the video pathway is provided by hardware and software video processing components of the user device that convert video data packets received by the user device to video signals that drive a display of the user device.

20. The system of claim 18, wherein the acts further comprises receiving user feedback inputted by a user regarding a quality of experience at a time of a detected interruption from the user device, wherein the analyzing includes analyzing the data interruption information and the user feedback to pinpoint one or more sources of the detected data interruption.

* * * * *